United States Patent
Matsuishi et al.

(10) Patent No.: US 7,512,059 B2
(45) Date of Patent: Mar. 31, 2009

(54) OPTICAL INFORMATION RECORDING MEDIUM AND PROCESS FOR PRODUCING OPTICAL INFORMATION RECORDING MEDIUM

(75) Inventors: Fujio Matsuishi, Tokyo (JP); Kanji Shimizu, Yokohama (JP); Morito Morishima, Hamamatsu (JP)

(73) Assignees: Mitsubishi Kagaku Media Co., Ltd., Tokyo (JP); Yamaha Corporation, Hamamatsu-shi (JP)

( * ) Notice: Subject to any disclaimer, the term of this patent is extended or adjusted under 35 U.S.C. 154(b) by 633 days.

(21) Appl. No.: 11/176,343

(22) Filed: Jul. 8, 2005

(65) Prior Publication Data

US 2006/0013116 A1  Jan. 19, 2006

Related U.S. Application Data

(63) Continuation of application No. PCT/JP03/16974, filed on Dec. 26, 2003.

(30) Foreign Application Priority Data

Jan. 8, 2003  (JP) .............................. 2003-001936

(51) Int. Cl.
G11B 7/24 (2006.01)
(52) U.S. Cl. .................... 369/275.1; 369/288; 428/64.4
(58) Field of Classification Search ... 369/275.1–275.5, 369/288, 287, 283; 428/64.2, 64.4, 64.5, 428/64.8; 430/270.16, 945, 270.15, 270.11
See application file for complete search history.

(56) References Cited

U.S. PATENT DOCUMENTS 6,329,035 B1   12/2001 Iwasaki et al.
7,129,019 B2 * 10/2006 Kakuta et al. .......... 430/270.16

(Continued)

FOREIGN PATENT DOCUMENTS

EP          1 271 499 A2    1/2003

(Continued)

OTHER PUBLICATIONS

U.S. Appl. No. 11/176,342, filed Jul. 8, 2005, Matsuishi et al.

(Continued)

*Primary Examiner*—Ali Neyzari
(74) *Attorney, Agent, or Firm*—Oblon, Spivak, McClelland, Maier & Neustadt, P.C.

(57) ABSTRACT

To provide an optical information recording medium on which visual information can be recorded on a label face by using a laser apparatus for recording and reading electronic information by irradiation with a low output laser without exerting e.g. thermal influence over electronic information recorded on the medium. The present invention provides an optical information recording medium 100 having such a structure that on a substrate 101, an electronic information recording layer 102, a reflective layer 103 formed in contact with the opposite side of the electronic information recording layer 102 from a side where a laser beam 107 enters, a protective layer 104, a visual information recording layer 105 and an overcoat layer 106 constituting an outermost layer are laminated in this order, wherein the surface roughness of the outermost layer on the label face side is at most ½ of the wavelength ($\lambda$) of a laser beam 108.

19 Claims, 2 Drawing Sheets

U.S. PATENT DOCUMENTS

| | | | |
|---|---|---|---|
| 7,190,662 B2 * | 3/2007 | Kondo | 369/275.1 |
| 2001/0026531 A1 | 10/2001 | Onodera et al. | |
| 2002/0142236 A1 | 10/2002 | Iwasaki et al. | |
| 2005/0036768 A1 | 2/2005 | Matsuishi et al. | |

FOREIGN PATENT DOCUMENTS

| | | |
|---|---|---|
| JP | 5-325265 | 12/1993 |
| JP | 6-76372 | 3/1994 |
| JP | 10-302316 | 11/1998 |
| JP | 2000-105947 | 4/2000 |
| JP | 2000-173096 | 6/2000 |
| JP | 2002-74757 | 3/2002 |
| JP | 2002-203321 | 7/2002 |
| JP | 2002-234263 | 8/2002 |
| JP | 2003-136846 | 5/2003 |

OTHER PUBLICATIONS

U.S. Appl. No. 11/176,343, filed Jul. 8, 2005, Matsuishi et al.

* cited by examiner

OPTICAL INFORMATION RECORDING MEDIUM AND PROCESS FOR PRODUCING OPTICAL INFORMATION RECORDING MEDIUM

BACKGROUND OF THE INVENTION

1. Field of the Invention

The present invention relates to an optical information recording medium capable of optically recording and reading information. More particularly, it relates to an optical information recording medium capable of optically recording and reading electronic information and further, capable of favorably recording visual information on a label face side by means of a laser beam.

2. Discussion of Background

Of an electronic information recording medium for recording, storing and rewriting a lot of information, importance as computer peripheral equipment is increasingly high in recent years. Particularly, an optical information recording medium on which recording and reading are carried out by means of a laser beam attracts attention as a mass storage recording medium since high density recording, storing and reading are possible. As examples of such an optical information recording medium, a phase-change type optical recording medium represented by CD-RW or DVD-RW and an organic dye type optical recording medium represented by CD-R or DVD-R may, for example, be mentioned.

The content of electronic information recorded in such an optical information recording medium can be confirmed by optical reading. On the other hand, it is important to display the content of electronic information as visual information on the surface of the medium in view of information management. Heretofore, as a display method therefor, a method of recording by printing the content of electronic information on a label face (the face opposite to the face on which electronic information is to be recorded) of a medium by means of an ink jet printer or a thermal transfer printer, or a method of bonding e.g. a label on which the content of electronic information is recorded to a label face of a medium, may, for example, be employed. Further, in recent years, a method of recording visual information on a visual information recording layer formed on a label face side of a medium by irradiation with a laser beam has been reported (e.g. JP-A-2000-173096, JP-A-2001-283464), which is expected as a method of recording visual information without exerting mechanical influences over a medium.

The above method of recording visual information on a label face side of a medium by means of a laser beam, as reported in JP-A-2000-173096 and JP-A-2001-283464, has the following drawbacks. Namely, the method of recording visual information on a label face side of a medium by means of a laser beam utilizes a change such as a reaction, melting or precipitation due to heat, and thus excessive irradiation with a laser beam will have a thermal influence or the like over the electronic information recorded on a medium, and accordingly careful attention has to be paid to an irradiation method. Accordingly, in order to reduce a thermal influence over a medium, it is necessary to use a laser beam with a low output at a level of from 10 to 200 mW. When such a low output laser beam is used, it is effective to efficiently concentrate the energy of the laser beam by condensing the low output laser beam on a layer (visual information recording layer) on which visual information is to be recorded, and for that purpose, it is considered necessary to apply a focus servo.

Further, in order to efficiently concentrate the low output laser beam on the visual information recording layer and to stably apply a focus servo, a reflective layer to obtain a reflected light to be utilized for focusing and a layer (laser beam transparent layer) comprising a material transparent to a laser beam, which protects the visual information recording layer from physical scratching or the like and which efficiently focuses the laser beam on the visual information recording layer may be formed in some cases.

However, in such a case, if the surface of the visual information recording layer or the laser beam transparent layer has irregularities, such a phenomenon occurs that the laser beam applied from the label face side is diffused on the surface of the visual information recording layer or the laser beam transparent layer. If the laser beam is diffused in such a manner, the amount of light which enters the visual information recording layer decreases, and the visual information can not favorably be recorded. Further, stable focusing tends to be difficult due to the diffusion.

The present invention has been made to solve technical problems which showed up when visual information is recorded on a visual information recording layer formed on a label face side of an optical information recording medium by means of a low output laser beam. Accordingly, the object of the present invention is to provide an optical information recording medium on which visual information can be recorded on a label face side by using a laser apparatus for recording and reading electronic information by irradiation with a low output laser beam without exerting bad influences over electronic information recorded on the medium.

In order to achieve such an object, the optical information recording medium of the present invention employs such a structure that an outermost layer such as a laser beam transparent layer having a reduced surface roughness is formed as the outermost layer on the label face side. Namely, the optical information recording medium of the present invention comprises a substrate and a visual information recording layer which is formed directly or via another layer on the substrate and on which visual information is to be recorded by means of a laser beam to be applied from a label face side on the opposite side from the substrate side, and is characterized in that the surface roughness of an outermost layer on the label face side is at most ½ of the wavelength of the laser beam to be applied from the label face side. Further, the surface roughness of the outermost layer is preferably at most ¼ of the wavelength of the laser beam.

Further, the optical information recording medium of the present invention is an optical information recording medium comprising a substrate having guide grooves and/or pits for recording and reading, and at least an electronic information recording layer on which digital information is to be recorded by means of a laser beam to be applied from the substrate side, a reflective layer and a visual information recording layer on which visual information is to be recorded by means of a laser beam to be applied from a label face side on the opposite side from the substrate side, laminated in this order on the substrate, characterized in that the surface roughness of an outermost layer on the label face side is at most ½ of the wavelength of the laser beam to be applied from the label face side. Further, the surface roughness of the outermost layer is preferably at most ¼ of the wavelength of the laser beam.

Further, the optical information recording medium of the present invention comprises a substrate, a visual information recording layer which is formed on the substrate and on which visual information is to be recorded by means of a beam to be applied from a label face side on the opposite side from the substrate side, and an overcoat layer formed on the label face side of the visual information recording layer, and is characterized in that the surface roughness of the overcoat layer is at most ½ of the wavelength of the beam.

The optical information recording medium of the present invention preferably has an overcoat layer as an outermost layer. Further, the overcoat layer is formed preferably by a material transparent to a laser beam, and the overcoat layer is formed preferably so that the lower limit of the thickness of the overcoat layer is 10 μm, and the upper limit is 100 μm. Further, the overcoat layer is formed preferably to have a refractive index of at least 0.4 and at most 2.6. Further, the visual information recording layer is characterized by being formed by such a material that its color developing properties or its transparency changes by a laser beam applied to a visual information recording layer.

Further, the optical information recording medium of the present invention is an optical information recording medium comprising a substrate, and an electronic information recording layer on which digital information is to be recorded by means of a laser beam to be applied from the substrate side, a reflective layer formed on the opposite side of the electronic information recording layer from the substrate side, and a protective layer formed on the opposite side of the reflective layer from the substrate side, formed on the substrate, characterized by having a visual information recording layer which is formed on the opposite side of the protective layer from the substrate side and on which visual information is to be recorded by means of a laser beam to be applied from a label face side on the opposite side from the substrate side, and an overcoat layer formed on the label face side of the visual information recording layer and having a surface roughness of at most ½ of the wavelength of the laser beam to be applied from the label face side.

Still further, the present invention provides a process for producing an optical information recording medium, which comprises a step of forming on a substrate an electronic information recording layer on which digital information is to be recorded by means of a beam to be applied from the substrate side, a step of forming a reflective layer as an upper layer of the formed electronic information recording layer, a step of forming a protective layer as an upper layer of the formed reflective layer, a step of forming as an upper layer of the formed protective layer a visual information recording layer on which visual information is to be recorded by means of a laser beam to be applied from a label face side on the opposite side from the substrate side, and a step of forming as an upper layer of the formed visual information recording layer an overcoat layer having a surface roughness of at most ½ of the wavelength of a laser beam to be applied from the label face side by a wet film formation method.

In the present invention, "visual information" represents information which is visually read, such as characters, symbols, images such as illustrations and photographs, and geometric patterns, and "electronic information" represents information, the content of which is read by some reading device, such as information recorded by digital signals.

According to the present invention, an optical information recording medium on which visual information can be recorded on a label face by means of irradiation with a low output laser beam at a level of from 10 to 200 mW can be provided.

EXPLANATION OF NUMERICAL REFERENCES 11, 100: Optical information recording medium, 12: Spindle, 13: Spindle motor, 14: Stepping motor, 15: Screw axis, 16: Pickup, 17: Laser beam, 101: Substrate, 102: Electronic information recording layer, 103: Reflective layer, 104: Protective layer, 105: Visual information recording layer, 106: Overcoat layer, 107: Laser beam, 108: Laser beam, 109: Reflected light, 200: Recording apparatus

DETAILED DESCRIPTION OF THE PREFERRED EMBODIMENTS

Now, the optical information recording medium of the present invention will be described in detail below with reference to figures.

Figure 1:
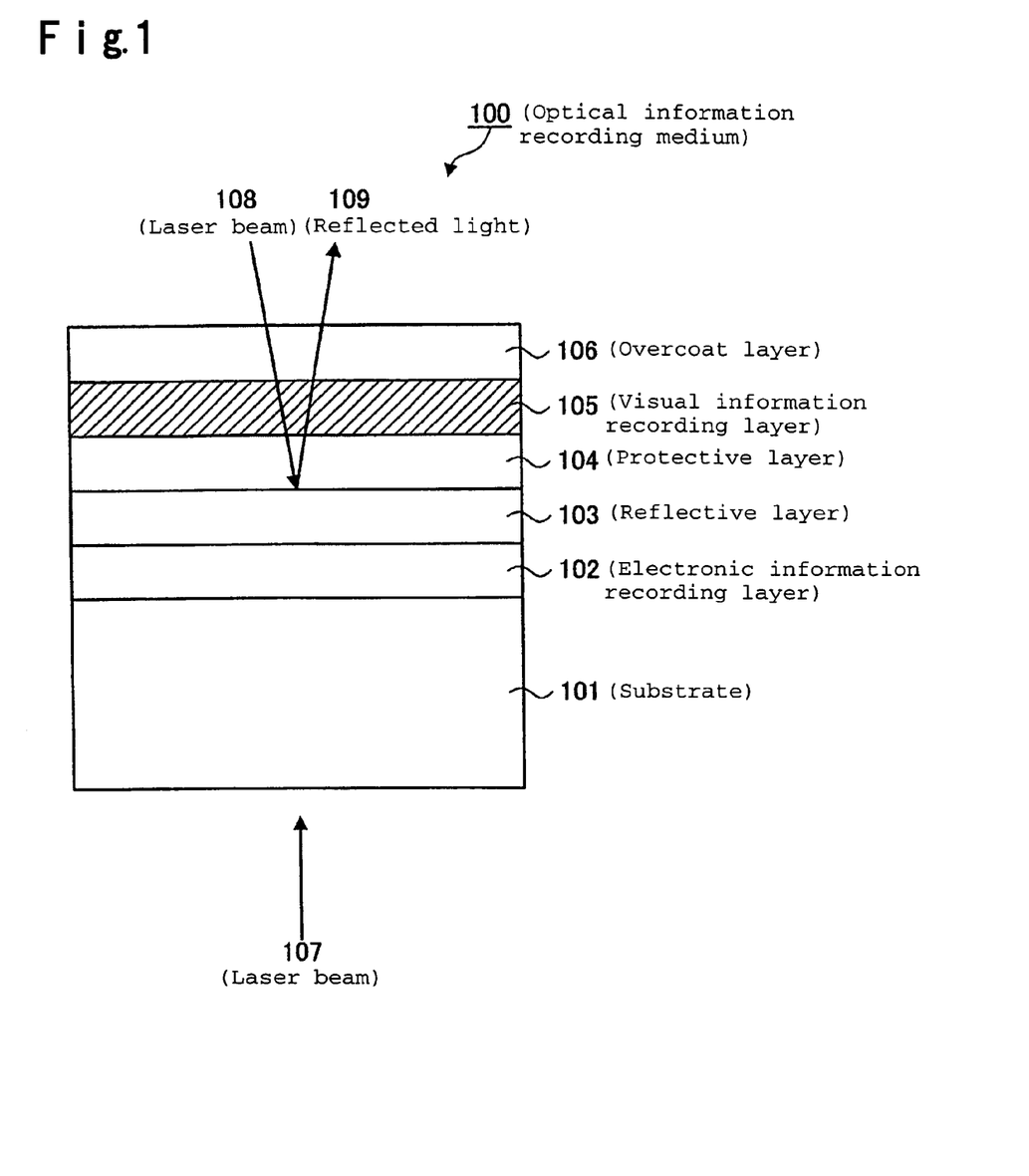
FIG. 1 is a diagram illustrating the structure of an optical information recording medium as the embodiment of the present invention.

FIG. 1 is a diagram illustrating the structure of an optical information recording medium as the embodiment of the present invention. An optical information recording medium 100 shown in this Fig. has such a structure that on a substrate 101, an electronic information recording layer 102, a reflective layer 103 formed in contact with the opposite side of the electronic information recording layer 102 from the side where a laser beam 107 enters, a protective layer 104, a visual information recording layer 105 and an overcoat layer 106 constituting an outermost layer are laminated in this order.

As shown in FIG. 1, on the electronic information recording layer 102 formed in the optical information recording medium 100, recording and reading of electronic information are carried out by means of the laser beam 107 applied via the substrate 101 from an objective lens (not shown) of a laser apparatus for recording and reading electronic information. On the other hand, on the visual information recording layer 105, visual information is recorded by means of a laser beam 108 applied via the overcoat layer 106 from a label face side, for example, when the optical information recording medium 100 is reversed and set to the laser apparatus for recording and reading electronic information. Further, a part of the laser beam 108 is reflected on the reflective layer 103 formed on a lower side of the visual information recording layer 105, and the resulting reflected light 109 is utilized for focusing to focus the laser beam 108.

The substrate 101 is basically formed by a material which is transparent to wavelengths of a recording light and a reading light for the electronic information recording layer 102. As a material to form the substrate 101, a polymeric material such as a polycarbonate resin, an acrylic resin, a methacrylic resin, a polystyrene resin, a vinyl chloride resin, an epoxy resin, a polyester resin or an amorphous polyolefin resin, or an inorganic substance such as glass may, for example, be used. Particularly, a polycarbonate resin is excellent in view of high light transparency, a small optical anisotropy and a high mechanical strength, and is preferred. In view of chemical resistance, moisture absorption resistance, optical characteristics, etc., an amorphous polyolefin is preferred.

On the substrate 101, for example, on the side which is in contact with the electronic information recording layer 102, guide grooves or pits for recording and reading are provided, which are formed by a molding method such as injection molding. Such guide grooves or pits are preferably formed at the time of formation of the substrate 101, but they may be formed by using an ultraviolet (UV)-curing resin on the substrate 101. Further, the lower limit of the thickness of the substrate 101 is usually 1.1 mm, preferably 1.15 mm, and the upper limit of the thickness is usually 1.3 mm, preferably 1.25 mm.

The electronic information recording layer 102 is formed by a material capable of recording electronic information (information, the content of which is read by some reading device, such as information recorded by digital signals) thereon by irradiation with a laser beam 107, and it is usually formed as a recording layer comprising an organic substance or a recording layer comprising an inorganic substance. The electronic information recording layer 102 may be directly formed on the substrate 101, or an optional layer may be formed between the substrate 101 and the electronic information recording layer 102 as the case requires.

When the electronic information recording layer 102 is a recording layer comprising an organic substance, an organic dye is mainly used. As such an organic dye, a macrocyclic azaannulene dye (such as phthalocyanine dye, naphthalocyanine dye or porphyrin dye), a polymethine dye (such as cyanine dye, merocyanine dye or squarylium dye), an anthraquinone dye, an azulenium dye, an azo dye, a metal complex of azo dyes or a metal complex of indoaniline dyes may, for example, be mentioned. Among them, a metal complex of azo dyes, a cyanine dye and a phthalocyanine dye are preferred. Particularly, a metal complex of azo dyes is preferred since it is excellent in durability and light resistance.

As the method for forming the electronic information recording layer 102 comprising an organic substance, a dry film formation method such as a vacuum deposition method or a sputtering method, or a wet film formation method which is generally carried out, such as a casting method, a spin coating method or a dipping method may be mentioned. Among them, a spin coating method is particularly preferred in view of mass productivity and cost.

When the electronic information recording layer 102 is formed as a recording layer comprising an inorganic substance, a rare earth transition metal alloy such as Tb.Te.Co or Dy.Fe.Co for recording by photomagnetic effect may, for example, be used. Further, a chalcogenide alloy such as Ge.Te or Ge.Sb.Te which undergoes phase change may also be used. Such a layer may be a single layer or may consist of two or more layers.

As the method for forming the electronic information recording layer 102 comprising an inorganic substance, a deposition method, an ion plating method or a sputtering method may, for example, be mentioned. Among them, a sputtering method is particularly preferred in view of mass productivity and cost. Further, the thickness of the electronic information recording layer 102 varies depending upon the type of the recording layer, and the lower limit is usually 5 nm, preferably 10 nm, and the upper limit is usually 500 nm, preferably 300 nm. Further, the electronic information recording layer 102 of the optical information recording medium 100 of the present invention may be a phase-change type recording layer on which recording and erasing are possible.

The reflective layer 103 is formed on the opposite side of the electronic information recording layer 102 from the substrate 101, and usually has a function to reflect the laser beam 107 to be applied form the substrate 101 side to the substrate 101 side. When guide grooves or pits for recording and reading are formed on the substrate 101, the reflective layer 103 has recessions and protrusions corresponding thereto. As a material to form the reflective layer 103, one having an adequately high reflectivity at the wavelength of the reading light may be mentioned. For example, a metal such as Au, Al, Ag, Cu, Ti, Cr, Ni, Pt, Ta or Pd may be used alone or as an alloy. Among them, Au, Al and Ag have a high reflectivity and are suitable as the material for reflective layer. Further, one containing Ag as the main component is particularly preferred in view of a low cost, a high reflectivity, etc.

As the method for forming the reflective layer 103, a deposition method, an ion plating method or a sputtering method may, for example, be mentioned. Among them, a sputtering method is particularly preferred in view of mass productivity and cost. Further, the lower limit of the thickness of the reflective layer 103 is usually 30 nm, preferably 50 nm, and the upper limit is usually 150 nm, preferably 120 nm.

The protective layer 104 is usually formed from a material which is transparent to a laser beam, and an ultraviolet (UV)-curing resin may, for example, be mentioned. As specific examples of an ultraviolet (UV)-curing resin, acrylate resins such as urethane acrylate, epoxy acrylate and polyester acrylate may, for example, be used. Most of such materials are substances which are transparent to a laser beam and therefore preferably used. Such ultraviolet (UV)-curing resins may be used alone or as a mixture of two or more of them. Further, the protective layer 104 may be a single layer film consisting of one layer or a multilayer film consisting of two or more layers.

As the method for forming the protective layer 104 from an ultraviolet (UV)-curing resin, it can be formed by coating the ultraviolet (UV)-curing resin as it is or a coating liquid prepared by dissolving the resin in a proper solvent, on the reflective layer 103, followed by irradiation with ultraviolet (UV) rays for curing. In such a case, as the coating method, a spin coating method or a casting method may, for example, be employed. The protective layer 104 may be formed also by the above-described coating method, a wet film formation method such as a screen printing method, or a dry film formation method such as a vacuum deposition method, a sputtering method or an ion plating method, and it is formed by a method optionally selected in accordance with the material to be used. Among them, a wet film formation method, particularly a spin coating method is preferred, and a spin coating method is commonly employed. The lower limit of the thickness of the protective layer 104 is usually 1 μm, preferably 3 μm, and the upper limit is usually 15 μm, preferably 10 μm.

The visual information recording layer 105 is usually such a layer that the color of a recording material constituting the layer changes by irradiation with a light and as a result, visual information (information which is visually read, such as characters, symbols, images such as illustrations and photographs, and geometric patterns) is recorded. The recording material constituting the visual information recording layer 105 is not particularly limited, but a substance by which the absorption of a visible light is changed is roughly classified into the following type (a) the color developing properties of which change and type (b) the transparency of which changes.

A recording material of the type (a) the color developing properties of which change may, for example, be an organic dye which is commonly used for optical recording of electronic information. As such an organic dye, a macrocyclic azaannulene dye (such as phthalocyanine dye, naphthalocyanine dye or porphyrin dye), a polymethine dye (such as cyanine dye, merocyanine dye or squarylium dye), an anthraquinone dye, an azulenium dye, an azo dye, a metal complex of azo dyes or a metal complex of indoaniline dyes may, for example, be mentioned.

Further, a leuco dye having a lactone ring moiety in its molecular structure may be mentioned. When a leuco dye is used, the contrast at the time of color development can be made high, and the amount of heat required for the color development can be suppressed low, such being preferred.

Specifically, the leuco dye may, for example, be a fluorane compound such as 3-diethylamino-7-chloroanilinofluorane, 3-diethylamino-6-methyl-7-anilinofluorane, 3-dibutylamino-6-methyl-7-anilinofluorane, 3-diethylamino-6-methyl-7-2,4-xylidinofluorane, 3-diethylamino-6-methyl-7-(m-toluidino)-fluorane, 3-diethylamino-7,8-benzofluorane or 3-diethylamino-6-methyl-7-xylidinofluorane; or a phthalide compound such as crystal violet lactone, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl) phthalide or 3,3-bis(1-n-butyl-2-methylindole-3-yl) phtalide. Among them, a phthalide compound is preferred.

With such a leuco dye, as the case requires, an electron-accepting compound, a dye which absorbs a recoding laser beam and generates heat, etc. may be used in combination. In such a case, the electron-accepting compound may, for example, be an organic phosphoric acid compound having an aliphatic group having at least 6 carbon atoms, an aliphatic carboxylic acid compound or a phenolic compound. Preferred is a phenolic compound.

As specific examples of the electron-accepting compound, the organic phosphoric acid compound may, for example, be dodecylphosphonic acid, tetradecylphosphonic acid, hexadecylphosphonic acid, octadecylphosphonic acid or eucocylphosphonic acid. The aliphatic carboxylic acid compound may, for example, be α-hydroxydecanoic acid, α-hydroxytetradecanoic acid, α-hydroxyhexadecanoic acid, α-hydroxyoctadecanoic acid, α-hydroxypentadecanoic acid, α-hydroxyeicosanoic acid, α-hydroxydocosanoic acid, α-hydroxytetracosanoic acid, α-hydroxyhexacosanoic acid or α-hydroxyoctacosanoic acid.

Further, the phenolic compound may, for example, be a gallic acid compound, a benzoic acid compound or a bisphenol compound. As specific examples of such a compound, the gallic acid compound may, for example, be methyl gallate, propyl gallate, butyl gallate or lauryl gallate. The benzoic acid compound may, for example, be methyl p-hydroxybenzoate, ethyl p-hydroxybenzoate or 2,4-dihydroxybenzoic acid. The bisphenol compound may, for example, be bisphenol S or bisphenol A. Further, 4'-hydroxy-4-octadecylbenzanilide, N-octadecyl-4-hydroxybenzamide, N-(4-hydroxyphenyl)-N'-cotadecylurea or 4-hydroxyphenylpropiono-behenyl hydrazide may, for example, be mentioned.

Such an electron-accepting compound may be used alone or in combination as a mixture of plural types thereof.

The laser beam absorbing dye may, for example, be various dyes as described as the organic dyes to be used for optical recording of electronic information, or an infrared ray absorbing dye such as a bisanthrone type or an indoaniline type.

Further, a recording material of the type (b) the transparency of which changes may, for example, be an organic low molecular weight compound which is dispersed in a resin host material in a size at a level of from 0.1 to 2 µm and which will be melted or crystallized by a heat treatment. As such a compound, a known organic low molecular weight compound such as a higher fatty acid having at least 12 carbon atoms may, for example, be used. Such an organic low molecular weight compound may be a compound consisting of a fatty acid, an aliphatic dibasic acid, a ketone, an ether, an alcohol, a fatty acid ester or a derivative thereof, and such compounds may be used alone or as a mixture of two or more types thereof.

Among the organic low molecular weight compounds which will be melted or crystallized by a heat treatment, a fatty acid alkyl ester having at least 12 carbon atoms has a low melting point (mp) and is melted or crystallized by a heat treatment at a relatively low temperature, and is thereby preferred. When a high melting point (mp) aliphatic dibasic acid having at least 10 carbon atoms is used together with the fatty acid alkyl ester having at least 12 carbon atoms, and the blend ratio of the fatty acid alkyl ester and the aliphatic dibasic acid is adjusted, the temperature range within which the fatty acid alkyl ester is clarified can be adjusted, and the transparency and the degree of white turbidity at a predetermined temperature can be changed.

The fatty acid alkyl ester having at least 12 carbon atoms may, for example, be methyl stearate, ethyl stearate, butyl stearate, octyl stearate, stearyl stearate, behenyl stearate, methyl behenate, ethyl behenate, buthyl behenate, octyl behenate, stearyl behenate, behenyl behenate, methyl lignocerate or ethyl lignocerate.

Further, the aliphatic dibasic acid having at least 10 carbon atoms may, for example, be sebacic acid, dodecanoic diacid, tetradecanoic diacid or eicosanoic diacid. When the fatty acid alkyl ester having at least 12 carbon atoms and the aliphatic dibasic acid having at least 10 carbon atoms are used in combination, the blend ratio of the former:the latter is preferably at a level of from 1:1 to 10:1, more preferably from 2:1 to 6:1. The high melting point aliphatic dibasic acid is considered to have a role to control the crystallization behavior as seed crystals of the low melting point fatty acid alkyl ester, and accordingly its blending amount is too small, there may be no effect, and if it is too large, there is possibility that the contrast decreases.

As the method for forming the visual information recording layer 105, a known wet film formation method as mentioned for the method for forming the electronic information recording layer 102 may be mentioned. Among them, preferred is a spin coating method or a screen printing method, more preferred is a spin coating method. Further, the lower limit of the thickness of the visual information recording layer 105 is usually 0.1 µm, preferably 0.5 µm, and the upper limit of the thickness is usually 5 µm, preferably 3 µm.

The overcoat layer 106 is formed on the label face side of the visual information recording layer 105 and constitutes an outermost layer to prevent the visual information recording layer 105 from physical scratching and to efficiently focus the laser beam 108 on the visual information recording layer 105. The material constituting the overcoat layer 106 is not particularly limited so long as it is a material which protects the visual information recording layer 105 from, e.g. external force and which is transparent to a laser beam.

As the material constituting the overcoat layer 106, as an organic substance, a thermoplastic resin, a thermosetting resin, an electronic ray-curing resin or an ultraviolet (UV)-curing resin may, for example, be mentioned. The thermoplastic resin, the thermosetting resin or the like is dissolved in a proper solvent to prepare a coating liquid, which is coated and dried to form the overcoat layer 106. The ultraviolet (UV)-curing resin as it is or a coating liquid prepared by dissolving the resin in a proper solvent is coated, followed by irradiation with ultraviolet (UV) rays for curing to form the overcoat layer 106. The ultraviolet (UV)-curing resin may, for example, be an acrylate resin such as urethane acrylate, epoxy acrylate or polyester acrylate. Further, as an inorganic substance, $SiO_2$, $SiN_4$, $MgF_2$ or $SnO_2$ may, for example, be mentioned. Such materials may be used alone or as a mixture of two or more of them. Further, the overcoat layer 106 may be a single layer film or a multilayer film consisting of two or more layers, so long as it is transparent to a laser beam 108.

The overcoat layer 106 is formed preferably by a wet film formation method using the above-described various organic substances. As the wet film formation method, a spin coating method, a casting method, a screen printing method or the like may be employed in the same manner as in the case of the above-described protective layer 104. Among them, a spin coating method is particularly preferred in view of high smoothness on the surface. Particularly when a transparent substrate prepared by a material transparent to a laser beam is to be bonded to form the overcoat layer 106, accurate positioning of the substrate is required, and various devices in production process will be required such that the bonding step is carried out under reduced pressure so that no bubbles will be contained in an adhesive layer. Accordingly, it is advantageous that the overcoat layer 106 is formed by a wet film formation method such as spin coating or screen printing in view of productivity.

The present invention is characterized in that the surface roughness of the overcoat layer 106 is at most ½ of the wavelength (λ) of the laser beam.

In general, the visual information recording layer 105 formed as a lower layer of the overcoat layer 106 contains a particulate component in many cases, and the surface of the visual information recording layer 105 has irregularities with a height at a level of from 1 to 3 μm. When the overcoat layer 106 is optionally formed on the visual information recording layer 105, the surface of the overcoat layer 106 tends to be rough by the influence of the visual information recording layer 105. In general, the laser beam to be used in the present invention is a semiconductor laser beam, and the semiconductor laser beam has a wavelength (λ) at a level of from 300 to 800 nm. Accordingly, it is considered that the surface roughness of the overcoat layer 106 will not be at most ½ of the wavelength (λ) of the laser beam when the overcoat layer 106 is optionally formed.

It can be realized to make the surface roughness of the overcoat layer 106 at most ½ of the wavelength (λ) of the laser beam, by suitably selecting the formation method and the materials used for the overcoat layer 106. In order that the surface roughness of the overcoat layer 106 is at most ½ of the wavelength (λ) of the laser beam, it is preferred to form the overcoat layer 106 by coating a material having a relatively low viscosity. Specifically, it is preferred to form the overcoat layer 106 by using a material having a viscosity of at least 50 cps and at most 7,000 cps. The surface of the overcoat layer hardly has irregularities within this viscosity range, whereby the surface roughness of the overcoat layer 106 can be suppressed low. Further, after the overcoat layer 106 is formed, a surface treatment such as polishing may be applied to its surface so as to suppress the surface roughness of the overcoat layer 106 to be at most ½ of the wavelength (λ).

The lower limit of the thickness of the overcoat layer 106 is 10 μm, preferably 20 μm, and the upper limit of the thickness is 100 μm, preferably 80 μm. If the thickness of the overcoat layer 106 is thinner than the lower limit, its function to prevent the visual information recording layer 105 may not sufficiently be maintained. Further, the surface of the overcoat layer tends to be rough due to the influence of the surface roughness of the visual information recording layer as a lower layer. Further, if the thickness is thicker than the upper limit, when the overcoat layer 106 is formed by coating, double coating or the like will be required, thus making the formation process complicated. Further, such a problem may arise that the warpage of the disk is significant due to shrinkage on curing of the coating material.

In order that the surface roughness of the overcoat layer 106 is stably small, it is very effective that the viscosity of the overcoat layer is at least 50 cps and at most 7,000 cps and that the thickness of the overcoat layer is at least 10 μm and at most 100 μm.

The reflectivity on the surface of the overcoat layer 106 is preferably at most 20% for example. In such a case, the refractive index of the overcoat layer 106 is preferably at a level of at least 0.4 and at most 2.6. Further, in order that the reflectivity on the surface of the overcoat layer 106 is at most 10%, the refractive index of the overcoat layer 106 is preferably at least 0.5 and at most 1.9.

It is required for the optical information recording medium 100 of the present invention that the surface roughness of the overcoat layer 106 forming the outermost layer on the label face side is at most ½, preferably at most ¼ of the wavelength (λ) of the laser beam. In the present invention, the surface roughness of the overcoat layer 106 or the like is obtained as an arithmetic mean roughness (Ra) measured in accordance with Japanese Standards Association (JIS) B0601. Further, the surface roughness may be measured in any region which is to be irradiated with a laser beam and used for recording of visual information. In the optical information recording medium 100 of the present invention, by making the surface roughness of the overcoat layer 106 to be at most ½, preferably at most ¼ of the wavelength (λ) of the laser beam, specifically, when a laser beam having a wavelength of 780 nm is used, by making the surface roughness (Ra) to be at most 0.39 nm, preferably at most 0.20 μm, diffusion of the laser beam 108 applied from the label face side on the surface of the overcoat layer 106 can be reduced. Accordingly, the amount of a light which enters the visual information recording layer 105 can be secured, and further, the reflected light 109 which is the reflected laser beam 108 applied from the label face side will be stabilized, and focusing will be carried out by the stabilized reflected light 109. Accordingly, recording of clear visual information on the visual information recording layer 105 becomes possible by using a low output laser beam.

In the optical information recording medium of the present invention, an optional layer other than the above-described layers may be formed. For example, when a recording layer comprising an inorganic substance is used as the electronic information recording layer 102, an optional layer may be formed between the layers or as an outermost layer of the medium, such as a dielectric layer which supports the electronic information recording layer 102. Further, not all the above-described layers for the visual information recording layer are necessarily required. For example, the overcoat layer may not be formed and the visual information recording layer is made to have a function as an overcoat layer. In such a case, the visual information recording layer constitutes an outermost layer, and accordingly it is required that the surface roughness of the visual information recording layer is at most ½, preferably at most ¼ of the wavelength (λ) of the laser beam, specifically, when a laser beam having a wavelength of 780 nm is used, the surface roughness (Ra) is at most 0.39 μm, preferably at most 0.20 μm.

Two embodiments of the optical recording medium of the present invention have been explained above, but the embodiment of the present invention is not limited to the above embodiments, and various modifications may be made. For example, the optical information recording medium may have a plurality of electronic recording layers. Further, in a case of an optical recording medium comprising a substrate (first substrate) having a thickness of about 0.6 mm and having guide grooves and/or pits and a so-called dummy substrate (second substrate) not having guide grooves and/or pits, the present invention may be applied by employing a laminate structure comprising first substrate/electronic information recording layer/reflective layer/adhesive layer/second substrate/visual information recording layer/overcoat layer or a laminate structure comprising first substrate/electronic information recording layer/reflective layer/adhesive layer/visual information recording layer/second substrate. In such a case, the overcoat layer side and the second substrate side are on the label face side, respectively, and as the case requires, another layer may be formed between the layers or as an outermost layer.

Further, the present invention is not limited to a so-called substrate face incident type optical disk, and in a case of a so-called film face incident type optical recording medium on which a laser beam is applied from the protective layer side (i.e. film face side) for recording and reading information, the present invention may be applied by employing a laminate structure comprising overcoat layer/visual information recording layer/substrate/reflective layer/electronic information recording layer/protective layer. In such a case, the overcoat layer side is on the label face side, and the substrate has guide grooves and/or pits on the side on which the information recording layer is formed. Further, another layer may be formed between the layers or as an outermost layer as the case requires.

Now, the optical information recording medium of the present invention will be explained in further detail with reference to Examples. However, the present invention is by no means restricted to such specific Examples.

(1) Recording of Visual Information on Optical Information Recording Medium

Figure 2:
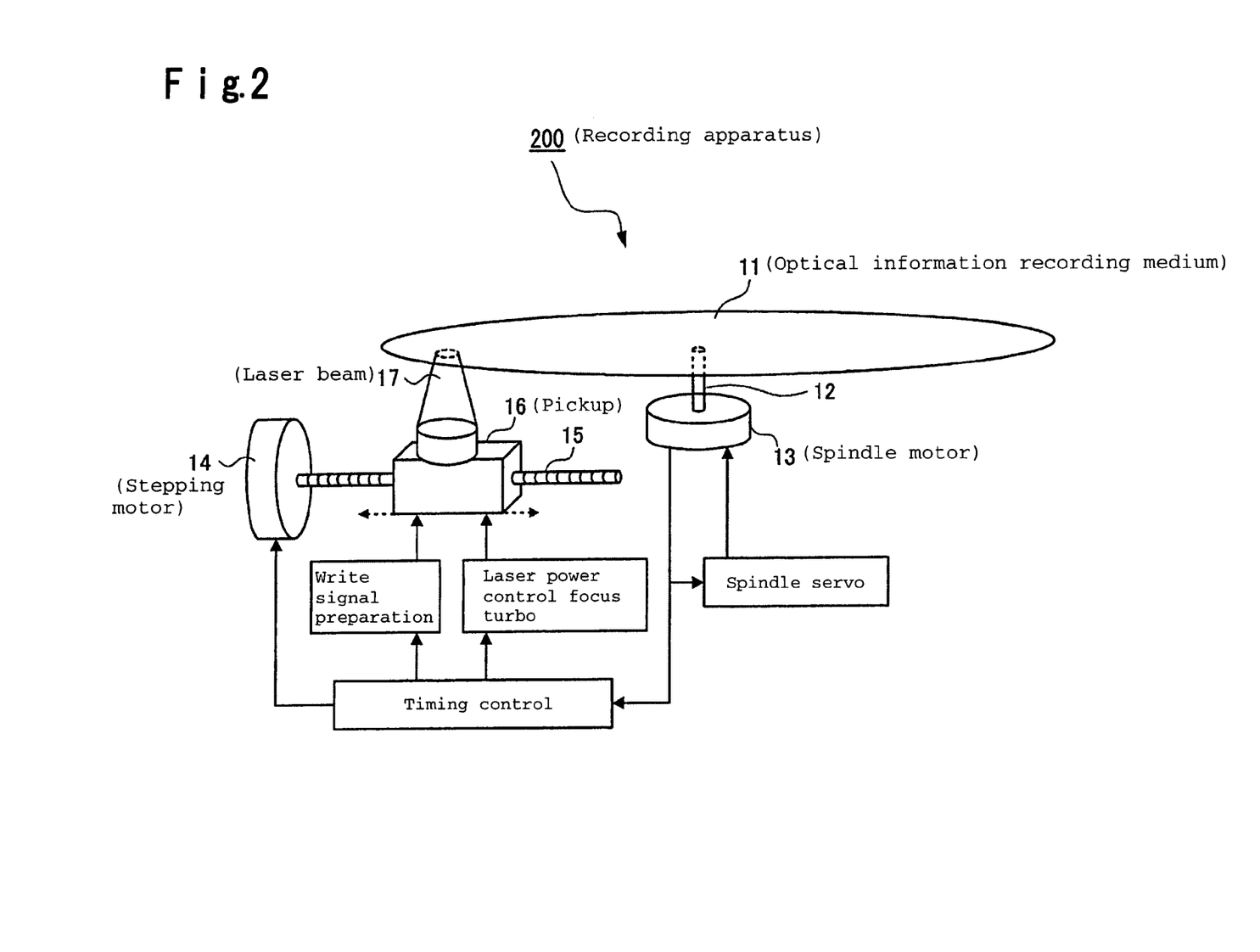
FIG. 2 is a diagram illustrating a recording apparatus for recording visual information on an optical information recording medium having a visual information recording layer.

FIG. 2 is a diagram illustrating a recording apparatus for recording visual information on an optical information recording medium having a visual information recording layer. A recording apparatus 200 as shown in FIG. 2 is to carry out recording of visual information on an optical information recording medium 11 having a visual information recording layer by a conventional optical disk drive, and comprises a spindle 12 to which the optical information recording medium 11 is mounted, a spindle motor 13 which rotates the spindle 12, a stepping motor 14 for feed, a screw axis 15 which is rotated by the stepping motor 14 and a pickup 16 which moves to an optional position.

As shown in FIG. 2, in the recording apparatus 200, the optical information recording medium 11 is mounted on the spindle 12 and rotated by the spindle motor 13, and at the same time, the screw axis 15 is rotated by the stepping motor 14 for feed to move the pickup 16 to an optional position. The spindle motor 13 is servo controlled by FG pulse signals so that the optical information recording medium 11 is rotated at an optional speed of rotation. The focus is adjusted on the optical information recording medium 11 face by the focus servo, and a laser beam 17 is condensed to write visual information on the optical information recording medium 11. At this occasion, the laser power is controlled by a front monitor so that writing at an appropriate power can be carried out. As the write signal, pulses with a duty of about 50% are irradiated on the optical information recording medium 11 face at an output of from 40 to 50 mW. The speed of rotation of the spindle is from 160 to 2,560 rpm.

(2) Measurement of Surface Roughness of Overcoat Layer

The arithmetic mean roughness (Ra, unit: µm) of the surface of the overcoat layer was measured in accordance with JIS B0601 by using a surface roughness measuring apparatus (MITSUTOYO SURFTEST model 402). The smaller the value, the smoother the surface.

EXAMPLES 1 TO 6 AND COMPARATIVE EXAMPLES 1 TO 3

A polycarbonate resin substrate having a thickness of 1.2 mm and having grooves with a width of 0.45 µm and a depth of 155 nm was formed by injection molding. The substrate was coated with a fluorine alcohol solution of a metal complex of azo dyes by spin coating, followed by drying at 90° C. for 15 minutes to form an electronic information recording layer having a thickness of 70 nm. Then, Ag was sputtered on the electronic information recording layer to form a reflective layer having a thickness of 70 nm. Further, the reflective layer was coated with an ultraviolet (UV)-curing resin composed mainly of an acrylate monomer ("SD-374" manufactured by DAINIPPON INK AND CHEMICALS, INCORPORATED) by spin coating, followed by irradiation with ultraviolet (UV) rays for curing to form a protective layer having a thickness of 7 µm, whereby a CD-R was prepared. Then, the protective layer was coated with a color developing organic dye composition obtained by blending 2.0 parts by weight of toluene with 0.2 part by weight of the color developing dye as shown in Table 1, 0.6 part by weight of an electron-accepting compound comprising a phenolic compound, 0.05 part by weight of a bisanthrone infrared ray absorbing dye and 4 parts by weight of methyl polymethacrylate (10 wt % toluene solution) by spin coating, followed by drying at 50° C. for 30 minutes to form a visual information recording layer. Further, the visual information recording layer was coated with a ultraviolet (UV)-curing resin composed mainly of an acrylate monomer by spin coating, followed by irradiation with ultraviolet (UV) rays for curing to form an overcoat layer (refractive index: 1.5) having a thickness of 20 µm. Nine types of optical information recording mediums having different surface roughnesses of the overcoat layers as shown in Table 1 were prepared in such a manner.

Each of the nine types of optical information recording mediums thus prepared was set to a recording apparatus 200 as shown in FIG. 2, and a low output laser beam having a wavelength (λ) of 780 nm and an output of 50 mW was applied from the label face side of the optical information recording medium to record visual information on the visual information recording layer, and the focusing properties were evaluated based on the following standards. The results are shown in Table 1.

TABLE 1

| | Visual information recording layer | Laser beam transparent layer | | | | |
|---|---|---|---|---|---|---|
| | Color developing organic dye | Ultraviolet-curing resin | Coating method | Viscosity cps | Surface roughness (Ra) | Focus |
| Ex. 1 | Leuco dye | Acrylate resin 1 | Spin coating | 130 | 0.06 | ◎ |
| Ex. 2 | Azo dye | Acrylate resin 1 | Spin coating | 130 | 0.06 | ◎ |

TABLE 1-continued

|  | Visual information recording layer | Laser beam transparent layer | | | | |
|---|---|---|---|---|---|---|
|  | Color developing organic dye | Ultraviolet- curing resin | Coating method | Viscosity cps | Surface roughness (Ra) | Focus |
| Ex. 3 | Leuco dye | Acrylate resin 2 | Spin coating | 500 | 0.05 | ◎ |
| Ex. 4 | Azo dye | Acrylate resin 2 | Spin coating | 500 | 0.06 | ◎ |
| Ex. 5 | Leuco dye | Acrylate resin 3 | Spin coating | 6,000 | 0.13 | ◎ |
| Ex. 6 | Azo dye | Acrylate resin 4 | Spin coating | 3,000 | 0.36 | ○ |
| Comp. Ex. 1 | Azo dye | Acrylate resin 5 | Spin coating | 9,000 | 0.71 | X |
| Comp. Ex. 2 | Azo dye | Acrylate resin 5 | Screen printing | 11,000 | 0.90 | X |
| Comp. Ex. 3 | Leuco dye | Acrylate resin 3 | Screen printing | 6,000 | 0.65 | X |

◎: Focusing carried out very stably.
○: Focusing carried out almost stably.
X: Focusing not carried out stably.

As evident from the results shown in Table 1, it is found that when the optical information recording layer is irradiated with a low output laser beam having a wavelength ($\lambda$) of 780 nm, focusing of a low output laser beam having a wavelength ($\lambda$) of 780 nm and an output of 50 mW is favorably carried out on each of the optical information recording mediums (Examples 1 to 6) wherein the surface roughness of the overcoat layer is at most ½ of the wavelength of the laser beam (0.05 to 0.36 μm), and visual information can favorably be recorded on the visual information recording layer. On the other hand, it is found that on each of the optical information recording mediums (Comparative Examples 1 to 3) wherein the surface roughness of the overcoat layer exceeds ½ of the wavelength of the laser beam (0.65 to 0.90 μm), focusing of the laser beam can not favorably be carried out and as a result, recording of clear visual information on the visual information recording layer is difficult.

The entire disclosure of Japanese Patent Application No. 2003-001936 filed on Jan. 8, 2003 including specification, claims, drawings and summary is incorporated herein by reference in its entirety.

What is claimed is:

1. An optical information recording medium comprising a substrate and a visual information recording layer which is formed directly or via another layer on the substrate and on which visual information is to be recorded by means of a laser beam to be applied from a label face side on the opposite side from the substrate side, characterized in that the surface roughness of an outermost layer on the label face side is at most ½ of the wavelength of the laser beam to be applied from the label face side.

2. The optical information recording medium according to claim 1, wherein the visual information recording layer has an overcoat layer formed on the label face side thereof.

3. The optical information recording medium according to claim 2, wherein the overcoat layer is formed by a material transparent to a laser beam.

4. The optical information recording medium according to claim 2, wherein the overcoat layer is formed so that the lower limit of the thickness of the overcoat layer is 10 μm and the upper limit is 100 μm.

5. The optical information recording medium according to claim 2, wherein the overcoat layer has a refractive index of at least 0.4 and at most 2.6.

6. The optical information recording medium according to claim 1, wherein the visual information recording layer is formed by such a material that its color developing properties or its transparency changes by a laser beam applied to the visual information recording layer.

7. An optical information recording medium comprising a substrate having guide grooves and/or pits for recording and reading, and at least an electronic information recording layer on which digital information is to be recorded by means of a laser beam to be applied from the substrate side, a reflective layer and a visual information recording layer on which visual information is to be recorded by means of a laser beam to be applied from a label face side on the opposite side from the substrate side, laminated in this order on the substrate, characterized in that the surface roughness of an outermost layer on the label face side is at most ½ of the wavelength of the laser beam to be applied from the label face side.

8. The optical information recording medium according to claim 7, wherein the visual information recording layer has an overcoat layer formed on the label face side thereof.

9. The optical information recording medium according to claim 8, wherein the overcoat layer is formed by a material transparent to a laser beam.

10. The optical information recording medium according to claim 8, wherein the overcoat layer is formed so that the lower limit of the thickness of the overcoat layer is 10 μm and the upper limit is 100 μm.

11. The optical information recording medium according to claim 8, wherein the overcoat layer has a refractive index of at least 0.4 and at most 2.6.

12. The optical information recording medium according to claim 7, wherein the visual information recording layer is formed by such a material that its color developing properties or its transparency changes by a laser beam applied to the visual information recording layer.

13. An optical information recording medium, comprising a substrate, a visual information recording layer which is formed on the substrate and on which visual information is to be recorded by means of a beam to be applied from a label face side on the opposite side from the substrate side, and an overcoat layer formed on the label face side of the visual information recording layer, characterized in that the surface roughness of the overcoat layer is at most ½ of the wavelength of the beam.

14. The optical information recording medium according to claim 13, wherein the overcoat layer is formed by a material transparent to a laser beam.

15. The optical information recording medium according to claim 13, wherein the overcoat layer is formed so that the lower limit of the thickness of the overcoat layer is 10 μm and the upper limit is 100 μm.

16. The optical information recording medium according to claim 13, wherein the overcoat layer has a refractive index of at least 0.4 and at most 2.6.

17. The optical information recording medium according to claim 13, wherein the visual information recording layer is formed by such a material that its color developing properties or its transparency changes by a laser beam applied to the visual information recording layer.

18. An optical information recording medium comprising a substrate, and an electronic information recording layer on which digital information is to be recorded by means of a laser beam to be applied from the substrate side, a reflective layer formed on the opposite side of the electronic information recording layer from the substrate side, and a protective layer formed on the opposite side of the reflective layer from the substrate side, formed on the substrate, characterized by having a visual information recording layer which is formed on the opposite side of the protective layer from the substrate side and on which visual information is to be recorded by means of a laser beam to be applied from a label face side on the opposite side from the substrate side, and an overcoat layer formed on the label face side of the visual information recording layer and having a surface roughness of at most ½ of the wavelength of the laser beam to be applied from the label face side.

19. A process for producing an optical information recording medium, which comprises a step of forming on a substrate an electronic information recording layer on which digital information is to be recorded by means of a beam to be applied from the substrate side, a step of forming a reflective layer as an upper layer of the formed electronic information recording layer, a step of forming a protective layer as an upper layer of the formed reflective layer, a step of forming as an upper layer of the formed protective layer a visual information recording layer on which visual information is to be recorded by means of a laser beam to be applied from a label face side on the opposite side from the substrate side, and a step of forming as an upper layer of the formed visual information recording layer an overcoat layer having a surface roughness of at most ½ of the wavelength of a laser beam to be applied from the label face side by a wet film formation method.

* * * * *